United States Patent [19]
Nussbaumer

[11] 3,781,873
[45] Dec. 25, 1973

[54] DIGITAL DATA TRANSMISSION SYSTEM USING MULTILEVEL ENCODING WITH VARIABLE DIPULSE SPACING

[75] Inventor: Henri Jean Nussbaumer, La Gaude, France

[73] Assignee: International Business Machine Corporation, Armonk, N.Y.

[22] Filed: Dec. 4, 1970

[21] Appl. No.: 95,223

[30] Foreign Application Priority Data
Dec. 30, 1969 France .............................. 6945782

[52] U.S. Cl. .......................... 340/347 DD, 325/38 A
[51] Int. Cl. .............................................. H04l 3/00
[58] Field of Search ............................ 340/347 DD; 325/38 A, 41, 42, 65

[56] References Cited
UNITED STATES PATENTS

| | | | |
|---|---|---|---|
| 3,492,578 | 1/1970 | Gerrish | 325/38 A |
| 3,139,615 | 6/1964 | Aaron | 325/38 A |

*Primary Examiner*—Thomas A. Robinson
*Assistant Examiner*—Jeremiah Glassman
*Attorney*—Hanifin and Jancin and Robert Bruce Brodie

[57] ABSTRACT

A digital data communication system in which N successive data elements generated within T seconds are encoded for transmission such that each data element is represented by a pulse and at some predetermined time later by the inverse of that pulse. The magnitude of the pulse and its later occurring inverse is governed according to the encoding rule of the particular multilevel (partial response) code actually used. In order to reduce the interference between inverse pulses and the original pulses of subsequently encoded data elements, the first pulse of each of the N successive data elements is encoded during corresponding successive ones of the N out of the next N+1 occuring intervals of duration T/N seconds, the N+1 interval being unused. The second and inverse pulse of each pair, starting with the first pair, is transmitted respectively N(T/N), (N–1) (T/N), (N–2) (T/N), —T/N seconds after the first pulse. This results in all of the inverse pulses interfering only during the N+1 intervals.

4 Claims, 15 Drawing Figures

FIXED DIPULSE SPACING & USE OF TWO CHANNELS WHEREIN EACH CHANNEL ENCODES ALTERNATE DATA ELEMENTS. N+1 INTERVAL TO CONCENTRATE INTERFERENCE

INVENTOR
HENRI J. NUSSBAUMER
BY Robert Bruce Brodie
ATTORNEY

VARIABLE DIPULSE SPACING & USE OF TWO CHANNELS WHEREIN EACH CHANNEL ENCODES ALTERNATE DATA ELEMENTS. DIFFERENT N+1 INTERVAL FOR EACH CHANNEL

VARIABLE DIPULSE SPACING & USE OF TWO CHANNELS WHEREIN EACH CHANNEL ENCODES ALTERNATE DATA ELEMENTS & INCLUDES A SECONDARY CHANNEL FOR INTERFERENCE COMPENSATION

RECEIVER DECODER

RECEIVER DECODER

VARIABLE DIPULSE SPACING & USE OF TWO CHANNELS IN WHICH THE DIPULSES ARE ENCODED ACCORDING TO A 3 LEVEL CODE WITH DIPULSE SPACING OF ORDER 2

TWO CHANNELS WITH 3 LEVEL ENCODING AND A SUPPLEMENTARY CHANNEL

DIGITAL DATA TRANSMISSION SYSTEM USING MULTILEVEL ENCODING WITH VARIABLE DIPULSE SPACING

BACKGROUND OF THE INVENTION

This invention relates to digital data communication systems and more particularly, to such systems using multilevel (partial response) digital data encloding such as binary, duobinary, ternary, and pseudo ternary and the like. The invention likewise relates to such systems where the encoded pulses are transmitted as dipulses. This means that each data element is represented by a pulse and at some predetermined time later by the inverse of that pulse. Whence, from this derives the usage of the term "dipulse."

It has been previously shown that the conversion of a binary pulse train (+1,−1) into codes having three or more levels (+1, 0, −1) permits higher data rates and/or greater frequency compression. Numerous authors, such as Adam Lender in "The Duobinary Technique for High Speed Data Transmission," IEEE paper CP63–283, 1963, E. R. Kretzmer in "Binary Data Communications by Partial Response Transmission," IEEE Transaction on Communication Technology, Feb. 1966, pages 67–68; and S. E. Becker in "New Signal Format for Efficient Data Transmission," Bell System Technical Journal, May–June 1966, pages 755–758; disclose the logical rules for the one or two stage conversion from a two level to a three or more level code. Relatedly, Kretzmer pointed out that the multilevel codes are designed to redistribute the signal spectrum away from the upper edge of the baseband. Also, the effect of such encoding is to extend the channel response to a single symbol over more than one symbol interval. Restated, this implies that one symbol in the multilevel code is influenced by two or more binary symbols. An error in the higher level code results in a greater information loss than that of a binary code. The trade off is between increased risk of error for higher information rates.

While the logical design of higher level codes for "compressing data" is pertinent, it does not treat the intersymbol interference problem inherent in the successive dipulse transmission of such multilevel encoded data. This interference arises between inverse pulses and the original pulses of subsequently encoded data elements occurring at the same point in time.

P. J. VanGerwen in "On the Generation and Application of Pseudo-Ternary Codes in Pulse Transmission," Philips Research Reports, 1965, Vol. 20, pages 469–484 described the behavior of an encoder having the frequency transfer function $|s(w)| = |1 - e^{-jw\tau}| = 2|\sin w\tau/2.|$ The network having this transfer function suppresses, i.e., $s(w)=0$ those frequency components where $w\pi/2 = k\tau$ $(k = 0, 1, 2, 3)$. If N bits to be encoded occurred in time T, then each bit had the duration of T/N. For m bits, $\tau = m(T/N)$. Consequently $w\tau/2 = k\pi = 2\pi t\tau/2 = k\pi$ and the spectral nults occur at $f = k\pi/\pi\tau = k/\tau = [k/m(T/N)]$ $(k = 0, 1, 2, 3)$. When a binary pulse train is applied to this encoder having a $\tau = T/N$, then a bipolar pulse train is obtained. This has the advantage of suppressing the D. C. frequency component. The dipulse form of transmission is thus seen as very closely related. Further, there is the suggestion that the spectral properties of the encoded signal can substantially influence all data transmission factors.

SPECTRAL PROPERTIES OF A DIPULSE

Let us now examine some of the known spectral properties of the dipulse. First, the dipulse may be defined as a function of time $f(\tau)$ having a first pulse of amplitude K and time width $\theta$ and an inverse pulse of magnitude −K and duration $\theta$ with the midpoint of the second and inverse pulse being spaced T′ seconds from the midpoint of the first pulse. More formally and exactly it may be said that $$f(\tau) = \begin{cases} K \text{ for } \frac{-\theta}{2} < \tau < \frac{\theta}{2} \\ -K \text{ for } T' - \frac{\theta}{2} < \tau < T' + \frac{\theta}{2} \\ 0 \text{ everywhere else} \end{cases}$$

The frequency spectrum $S(w)$ of function $f(\tau)$ is obtained by taking the Fourier transform. Accordingly:

(1) $$S(w) = \int_{-\infty}^{\infty} e^{-jw\tau} f(\tau)\, dt$$

(2) $$S(w) = \int_{-\theta/2}^{\theta/2} K e^{-jw\tau} dt - \int_{T'-\theta/2}^{T'+\theta/2} K e^{-jw\tau} dt + \int_{\theta/2}^{T'-\theta/2} e^{-jw\tau} (o)\, dt$$

$$= \frac{-K}{jw} \int jw e^{-jw\tau}\, dt - \frac{K}{jw} \int jw e^{-jw\tau}\, dt$$

$$= \left(\frac{-K}{jw}\right) e^{-jw\tau}\Big]_{-\theta/2}^{\theta/2} - \left(\frac{-K}{jw}\right) e^{-jw\tau}\Big]_{T'-\theta/2}^{T'+\theta/2}$$

3. inserting the limits and rationalizing $$S(w) = (-K/jw)\,[e^{-j(w\theta/2)} - e^{j(w\theta/2)}] + (Ke/jw)^{-jwT'}\,[e^{-j(w\theta/2)} - e^{+(jw\theta/2}]$$

(4) $$\text{Now } \sin \frac{w\theta}{} = \frac{e^{+jw\theta/2} - e^{-jw\theta/2}}{2j}$$

5. Rearranging the terms $$S(w) = \frac{2K}{w}\left[\frac{e^{jw\theta/2} - e^{-jw\theta/2}}{2j}\right] - \frac{2Ke^{-jwT'}}{w}\left[\frac{e^{jw\theta/2} - e^{-jw\theta/2}}{2j}\right]$$

6. Substituting (4) into (5)

$$S(w) = (2K/w)\sin(w\theta/2) - (2K/w)\, e^{-jwT'} \sin(w\theta/2)$$

7. Factoring:

$$S(w) = (2K/w)\sin(w\theta/2)\,[1 - e^{-jwT'}]$$

This expression permits us to view the relationship between frequencies $w$ and dipulse interval T′ for the purpose of encoding the dipulses in such a way as to concentrate the intersymbol interferences at time intervals which are not actually used to transmit data.

SUMMARY OF THE INVENTION

The invention contemplates the use of dipulses of different lengths and time positionings. Thus, the first pulse of each of N successive data elements is encoded during corresponding successive ones of N out of N+1 time intervals, each time interval being of T/N seconds duration. Significantly, the N+1 interval is unused. The second and inverse pulse of each pair, starting with the first pair, is transmitted such that all the inverse pulses are generated during N+1 intervals. Thus, the inverse pulse of the first pair is spaced apart by NT/N seconds from the first pulse. The inverse pulse of the second pair is (T/N) apart (N−1) (T/N) seconds from the first pulse of that pair. Likewise, the inverse pulse of the third pair is spaced apart (N−2) (T/n) seconds from its first pulse. It should be pointed out that this spacing is completely independent of the multilevel represented by the first pulse of each pair and its mirror inverse pulse. More generally, it may be said that the invention contemplates encoding dipulses of length $m$N(T/N); $m$(N−1) (T/N), $m$ (N−2) (T/N), — $m$(2T/N), $m$(T/N) where the "order" of the dipulse spacing as encoded is determined by the length of the longest dipulse used and m is a constant. A code of order "two" means that $m$N = 2 since the longest spacing will be $m$N(T/N). The constant $m$ applies where it is desired to concentrate the intersymbol interference in the $m^{th}$ N+1 subsequent interval.

In a previous section, the amplitude spectrum S($w$) was derived for the dipulse. That is:

$$S(w) = (2K/w) \sin (w\theta/2) (i - e^{-jwT'} \quad )$$

T′ is related to the variable dipulse spacing by the relation $$T' = (N+1-k)(T/N) \text{ where } k = 1, 2, 3, — N$$

Now, if the dipulse spacing T′ can be related to those frequencies $w$ for which S($w$) = 0, then the resulting frequency spectrum is indeed independent of the magnitude of the pulses (K, −K) which constitute each dipulse. Consequently, multilevel dipulses can be used without modifying the frequency spectrum shape.

When S($w$) = 0 then $0 = (2K/w) \sin (w\theta/2) [1 - e^{-jwT'}]$

Thus $$[1 - e^{-jwT'} \quad ] = 0 \text{ and } e^{-jwT'} \quad = 1$$

for $$wT' = 2l\pi \text{ where } l = 0, 1, 2, —$$

$$2\pi f T' = 2\gamma\pi$$

or $$f = l/T' = [l/(N+1-k)][T/N] \text{ assume } l \text{ constant}$$

Therefore $$S(w) = 0 \text{ when } f = \frac{l}{N\frac{T}{N}}; \frac{l}{(N-1)\frac{T}{N}}; \frac{l}{(N-2)\frac{T}{N}};$$

for different orders or maximum dipulse spacing, i.e., $m$N = 1, 2. 3.

Figure 4:
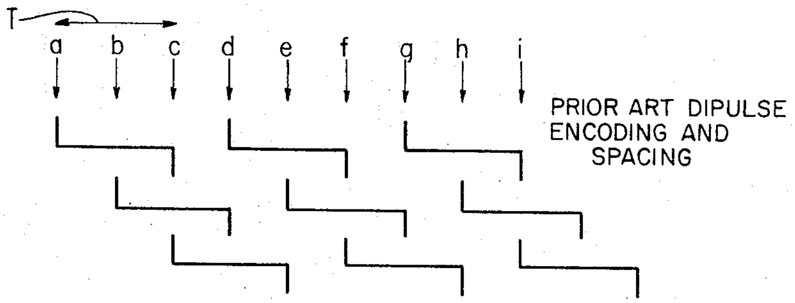

FIG. 4 illustrates the intersymbol interference in prior art systems resulting from the successive transmission of dipulses with fixed spacing.

Figure 5:
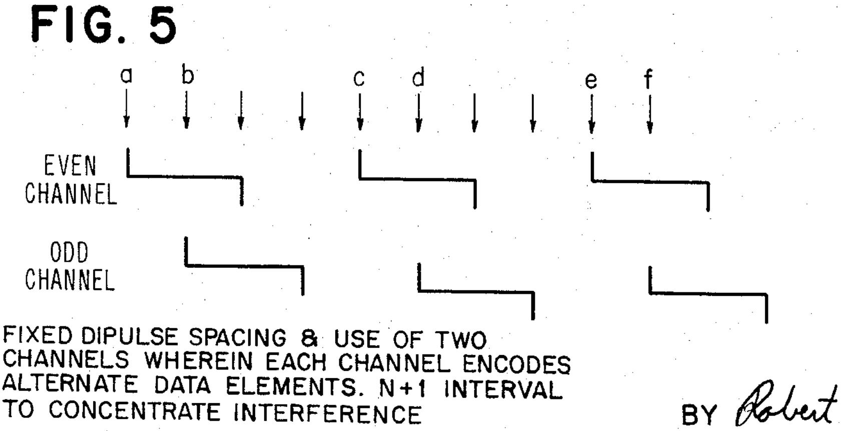

FIG. 5 exhibits the effect of successive dipulse transmission with fixed spacing and an N+1 interval provided so as to avoid interference.

Figure 6:
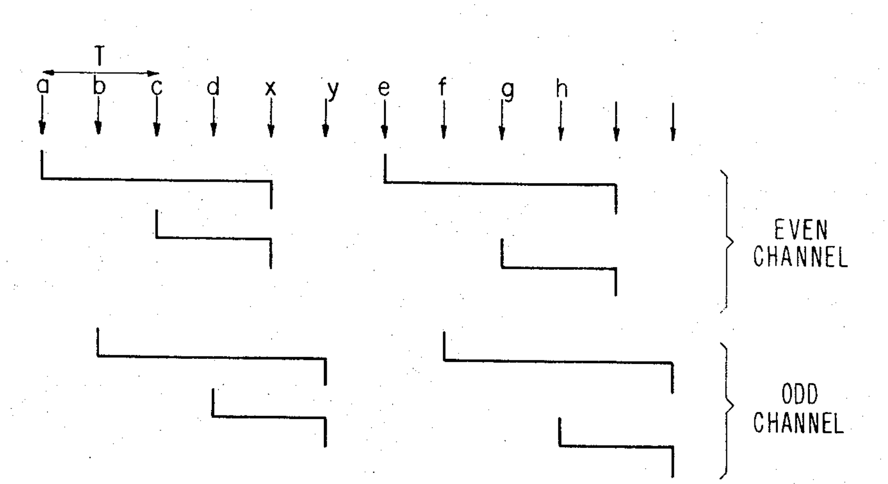

FIG. 6 represents the effect of successive dipulse transmission of order two with variable dipulse spacing and an N+1 interval. In FIGS. 5 and 6 each of the successive data elements ($a$, $b$, $c$, $d$, $e$) are alternative encoded and transmitted over a separate channel. Thus, the even channel would encode $a$, $c$, $e$ and the odd channel $b$, $d$, $f$.

Figure 7:
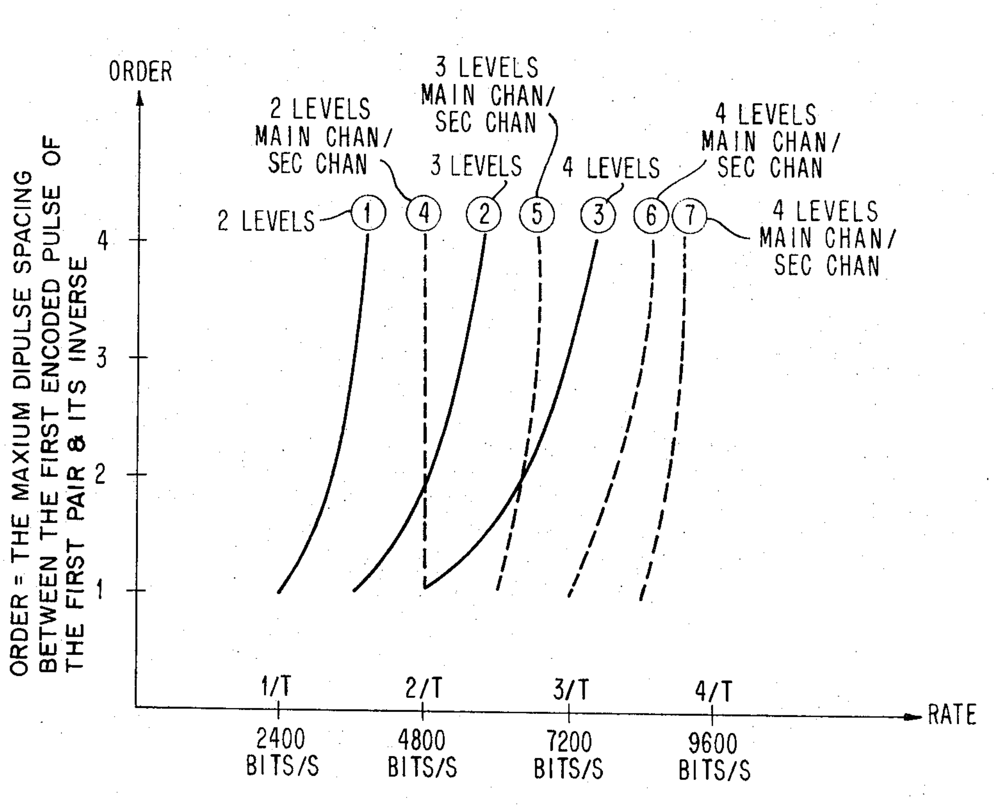

FIG. 7 illustrates the variation in data rates for a given higher level encoding (i.e., duobinary or ternary) as a function of the order or the maximum dipulse spacing between the first encoded bit of a first pair and its inverse.

Figure 8:
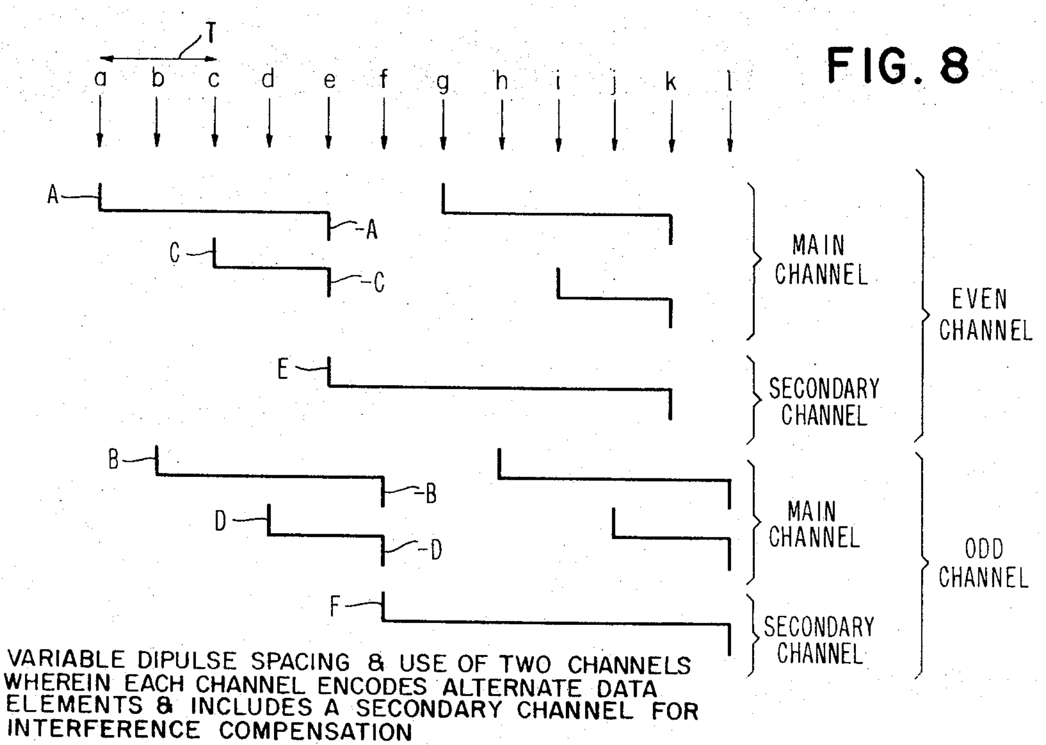

FIG. 8 shows a variation of the variable dipulse spacing method set forth in FIG. 6, in which an additional (encoded) dipulse is sent (secondary channel) having its original and inverse pulses coinciding with preselected N+1 intervals of the regular transmission (main channel) for compensating against excessive interference.

Figure 9:
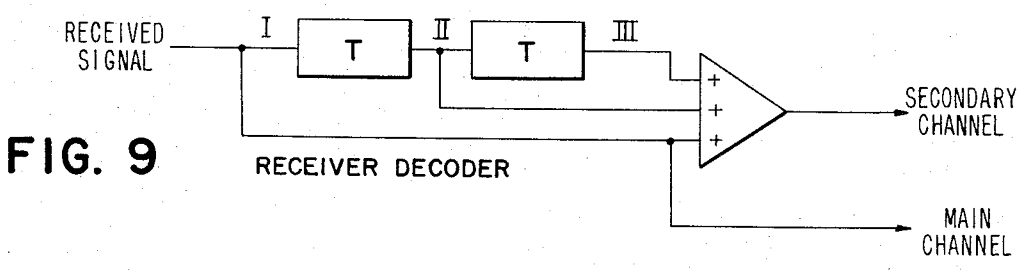
Figure 11:
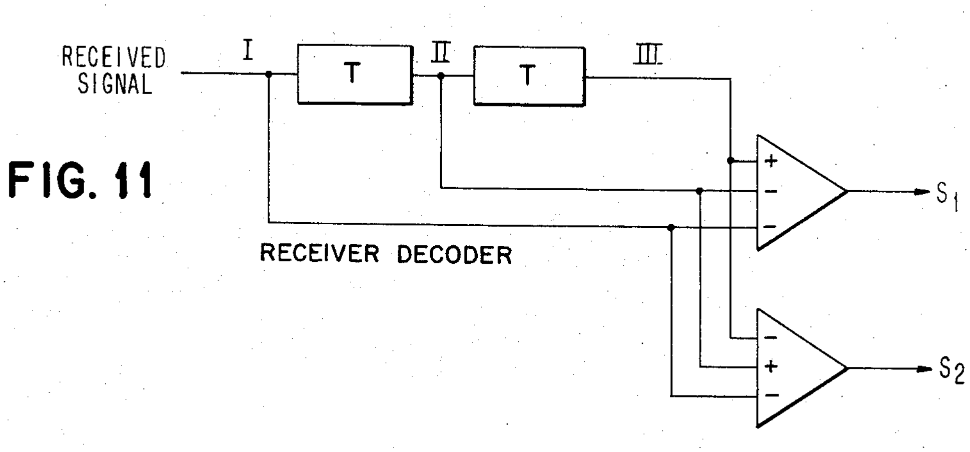

FIGS. 9 and 11 show receiver decoders for converting dipulses encoded according to the method depicted in FIG. 8 into the original binary signal train.

Figure 10A:
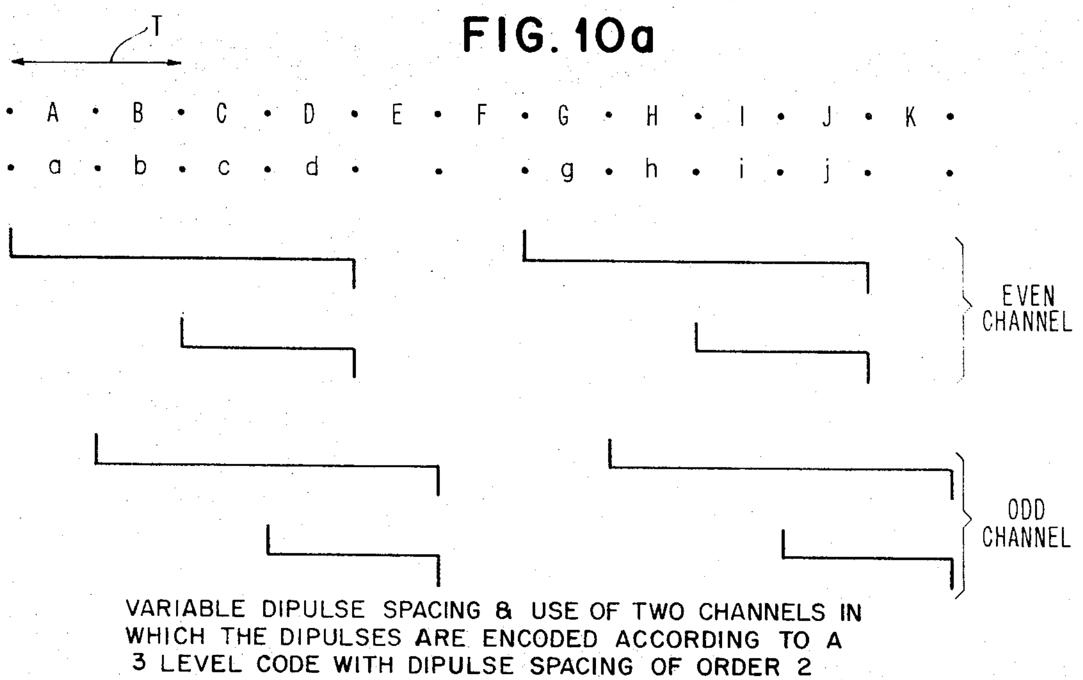

FIG. 10A is a timing and dipulse spacing diagram similar to that of FIG. 6 wherein dipulses are encoded according to a three level code with dipulse spacing of order two.

Figure 10B:
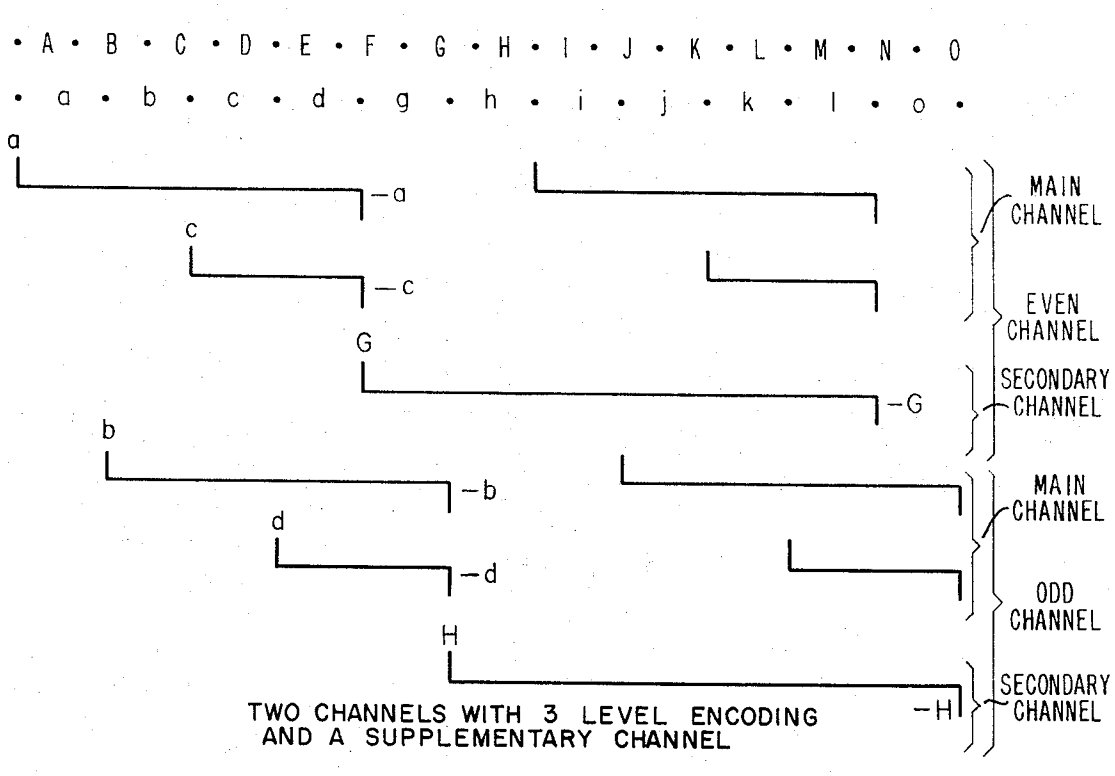

FIG. 10B is a timing and dipulse spacing diagram similar to that of FIG. 8 wherein dipulses are encoded according to a three level code with dipulse spacing of order two and using a secondary channel.

DESCRIPTION OF THE PREFERRED EMBODIMENT

Figure 1A:
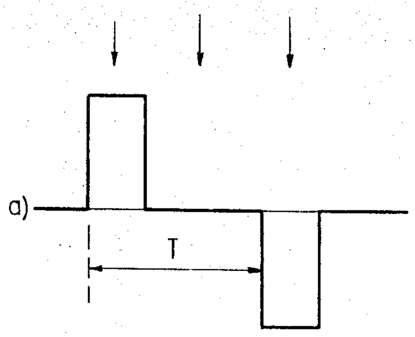
FIGS. 1A and 1B show the general shape of the dipulse with variable spacing T between the original pulse and its "mirror" inverse.
Figure 1B:
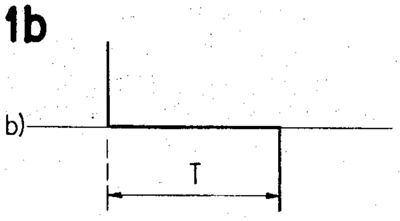
Figure 2:
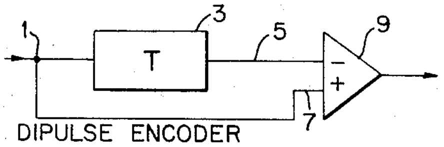
FIG. 2 shows an encoder for converting a single pulse into a dipulse as seen in FIG. 1A.

Referring now to FIG. 2 of the drawings, there is shown a dipulse encoder. This device does not perform the conversion from a binary code to a higher level code. Rather, it takes each pulse in the higher level code and gates it upon a transmission line. It then gates the "mirror" inverse of that pulse upon the line at a predetermined time later. Devices for converting into multilevel codes are described in the previously mentioned prior art. Likewise, the dipulse encoder of FIG. 2 is described in detail in the P. J. VanGerwin article. However, for purposes of completeness, consider a positive going pulse as shown in FIG. 1A and 1B being applied to the dipulse encoder input 1. The pulse is simultaneously applied to summer 9 over path 7. The summer at that point in time algebraically adds the negative of the signal magnitude at input 5 to the positive of the signal magnitude at input 7. Thus, the positive pulse applied at input 7 immediately appears at the summer output. The pulse on path 5 has been delayed T seconds by element 3 and is applied to the summer which yields in turn the negative or mirror of the original pulse.

In the figures, the vertical arrows are representative of the sampling instants and the triangles are representative of the analog adders.

Figure 3:
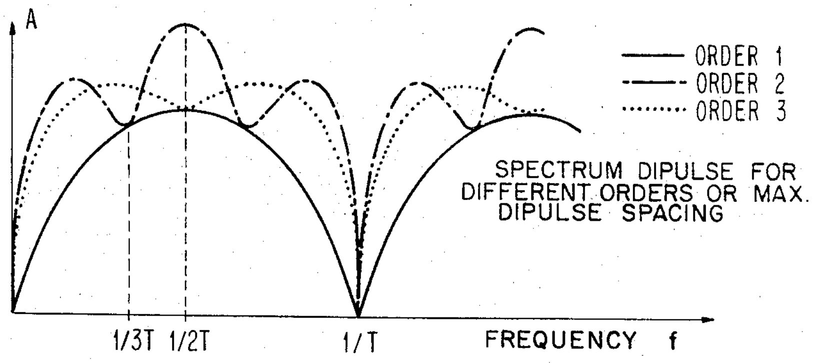
FIG. 3 represents the amplitude-frequency characteristic $$S(w) = (2K/w) \sin (w\theta/2) [1 - e^{-jwT'}]$$

As previously mentioned, the conventional partial response coding methods using a passband of 0—(1/T), for instance, transmit the data at a rate 2/T. The prior art method contemplates using a dipulse formed of a first pulse, followed after a time period T by the pulse (or echo) which is the inverse of the first one. This is shown in FIG. 1A. This time interval is alloted to each data arriving with a rate 2/T. In FIG. 1B, there is shown the dipulse such as it appears in the following description. Such a coding method can be carried out by the device shown in FIG. 2, the device including a two-input logic adder and a delay circuit T. This device is only an example from amongst multiple possibilities. Such a conventional coding has a frequency spectrum the envelope of which is shown in FIG. 3. FIG. 4 is an example of such a coding.

In FIG. 5, data elements *a*, *b*, *c*, . . . are the binary data and the rate is duly 2/T. Since the beinning of this description, no limitation has been made as to the number of the levels of each data, i.e., as to the number of the levels of either pulse which the dipulse allotted to said data is formed of. However, it should be noted that, in the case of FIG. 4, although the data is binary data, i.e., two-level data, the sampling of the signal built up at the instants corresponding to data *c*, *d*, . . . will give a three-level signal which results from the interference of the dipulses. At the receiver, this method requires a quite complex decoding operation since there are on the line only the signals that result from an interference, except for the first data.

Still with the same passband 0—(1/T), it is possible to obtain a transmission with no interference by proceeding to the transmission of only every other sampling instant over the even and odd channels, such as shown in FIG. 5. From the binary data, thus, there is obtained a two-level signal since it has no interference, during the sampling of data such as *a*, *b*, . . . , but the rate is reduced since, in that case, it is only (1/T).

According to the invention, and in order to increase the efficiency of the latter code, still with the use of the passband 0—(1/T). The transmission will be carried out by skipping one sampling instant out of three and using alternately two dipulses, one of time length T and the other one, of time length 2T, in order to have no symbol interference such as shown in FIG. 6.

In case of a binary coding, a two-level signal is obtained at the sampling instants corresponding to the pg,11 data such as *a*, *b*, *c*, *d*, *e*, *f*, *g*, and *h* and the data rate is brought to (4/3T). This code will be termed "high efficiency" partial response code" (HEPR) of the second order. The extension of this formation mode allows the previous code to be called HEPR code of order 1, the assembly of these codes forming a family.

FIG. 3 shows the envelope of the frequency spectrum of the HEPR code of order 2. This envelope has always a first zero at F = 1/T, and also presents a zero at F = 1/2T and which results from the dipulse which is 2T time long.

Thus, for an assembly of three consecutive sampling instants, two dipulses are transmitted during the first two sampling instants of this assembly, the third one being unused, these dipulses being 2T and T long for each of the even and odd channels.

Likewise, the third and fourth order two-level HEPR codes may be built up by skipping one sampling instant out of four and five instants, respectively and by making use of three dipulses which are respectively 3T, 2T and T time-long for the third dipulse, and four dipulses which are respectively 4T, 3T, 2T and T time-long for the fourth order. Therefore, the data rates 3/2T and 8/5T will be respectively obtained.

Curve 1 of FIG. 7 is representative of the data rate with respect to the code order in the case of two-level signals. This curve is asymptotic at rate 2/T for an infinite order. It should be noted that, in this case, the signal amplitude at the sampling instants of the echoes, such as *x* and *y* in FIG. 6, tends towards the infinite, which is in conformity with the Nyquist's work.

The same reasoning may apply to the case of several level data, thereby the dipulses having several levels. FIGS. 5 and 6 are still valid, data *a*, *b*, . . . in that case, being data with several levels. Curves 2 and 3 in FIG. 7 are representative of the case of data with three and four levels, respectively. When considering the case of three-level data, it should be noted that the data rate 2/T is obtained with the code of the second order. The code of the fourth order, still with three-level dipulses, corresponds to a data rate 2.4/T, i.e., an increase of 20 percent with respect to the conventional partial response coding for the same number of levels and the same passband width.

In order to clarify the description, the described embodiments are limited to the code of order 4. Such a code corresponds to a transmission of four dipulse groups distributed over an assembly of five consecutive sampling instants. It is evident that this method may be extended to the code of order n, which corresponds to a transmission of n dipulses over an assembly of $(n+1)$ consecutive sampling instants.

Up to now, the dipulses have been chosen so that the symbol interferences are concentrated on sampling points, such as for instance, *x* and *y* of FIG. 6, which points are not actually utilized for the data transmission. This reduces the efficiency of the code and requires the use of high order to obtain a significant increase of the rate with respect to the conventional partial response coding operation.

According to the invention, and in order to improve said coding operation, an additional data element is transmitted into a secondary channel in each of the even and odd channels, at instants where the echoes are concentrated. The even and odd channels, therefore, are both formed of a main channel and of a secondary channel. The dipulse transmitted into the secondary channel is such that the first pulse and its echo appear at the sampling instants where the echoes are concentrated in the corresponding main channel.

Such a coding operation is shown in FIG. 8 in the case of a HEPR code of order 2. In the case of two-level data, at the sampling instants corresponding to the echoes, such as *e* and *f*, the signal resulting therefrom is a four-level signal. However, this coding operation does not require a four-level detector at the reception. Indeed, the echoes in a main channel interfering with the data in the corresponding secondary channel, may be compensated for by memorizing the data corresponding to the echoes since they are in the line with no interference. This may be realized, at the reception and for each channel, by the circuit shown in FIG. 9 and still for the case of a HEPR code of order 2. This circuit includes a three-input logic adder and two delay circuits, each of them having a delay T, which are cascade-mounted. The adder receives directly the data in the line, on the one hand, and the T- and 2T- delayed data on the other hand. The output of the adder will produce a two-level signal at the sampling instants of the data transmitted over the secondary channel, such as *e*, *f*, *k* and *l*. The output of the device referred to as a main channel, will produce a two-level signal at the sampling instants of the data transmitted over the main channel, such as *a*, *b*, *c*, *d*, *g*, *h*, . . . (FIG. 8) since at these sampling instants there is no interference.

Curves 4, 5, and 6 shown in FIG. 7 are representative of the performances of the various codes with a secondary channel. It should be noted that the transmissions with a secondary channel are greatly improved with respect to the conventional partial response coding. For instance, the three-level code of order 4 with the secondary channel operates at a rate of 2, 8/T, which shows up a rate increase of 40 percent with respect to the conventional partial response, for the same number of levels and for the same passband width.

FIGS. 10A and 10B are time diagrams for the 4,800/6,400-baud transmission which makes use of a three-level coding of order 2, according to the invention. The 4,800-baud rate is obtained by using only the main channels, and the 6,400-baud rate is obtained by using both main channels and secondary channels. Data A, B, C, . . . are the binary data to be transmitted, and *a*, *b*, *c*, . . . are representative of the ternary data obtained upon combination of the binary data A, B, . . . The represented dipulses are three-level dipulses which are representative of data *a*, *b*, *c*, . . .

FIG. 10A illustrates the case of a 4,800 baud transmission. Since the data *a*, *b*, *c*, . . . are ternary, four of these data, i.e., *a*, *b*, *c* and *d* are sufficient to represent the six binary data A, B, C, D, E and F. The latter data will be memorized, for instance, in one or several shift registers in order to be able to realize their combination for the obtainment of the ternary data. This memorization will be used also for the generation of the echoes of each dipulse.

In the case of a 6,400-baud transmission, making use of the secondary channels, FIG. 10B, the four ternary data *a*, *b*, *c*, *d* are also combinations of six binary data A, B, C, D, E and F, and the ternary data *g* and *h* transmitted over the secondary channels are directly representative of the binary data G and H, respectively. In the case of data *g* and *h*, only two of their three levels are used. At the reception side, the device shown in FIG. 9 will still be used but this time it is followed with a three-level detector.

In the case of a 4,800-baud transmission, the reception will be improved by the correlation device shown in FIG. 11. This device makes use of the energy contained in the echoes to reinforce the data at the sampling instant and combines the first pulses in the dipulses and the echoes in order to minimize the noise resulting from the transmission. Such a device is described in detail in the French Pat. application, Ser. No. 6,911,363, filed by the applicant on Apr. 17, 1969, in the case of a transmission with weighted and multiple echoes.

Figure 2A:
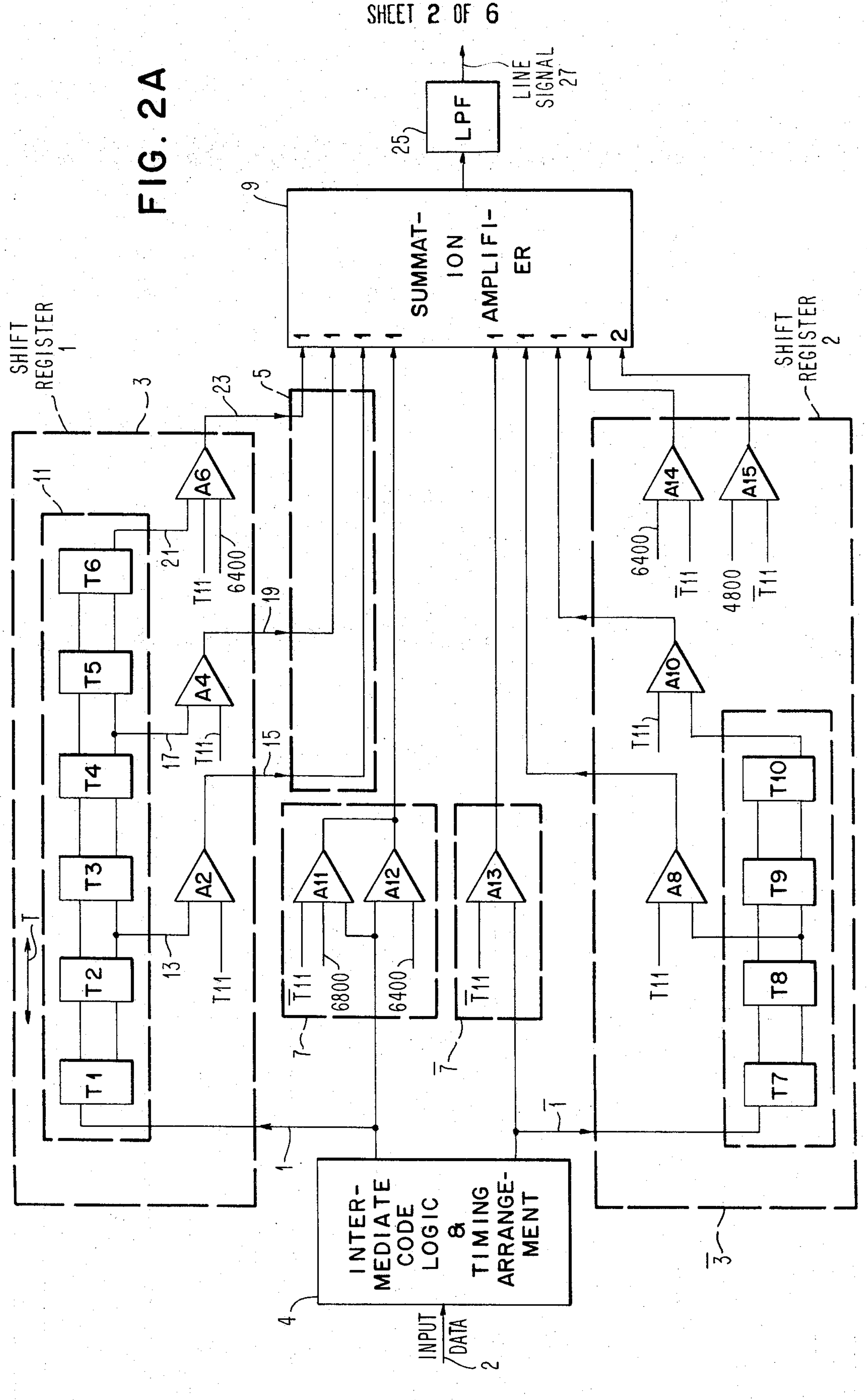
FIG. 2A is a logic circuit implementation of the encoder shown in FIG. 2 embodying the invention for converting successive pulses into dipulses of variable dipulse spacing.
Figure 2B:
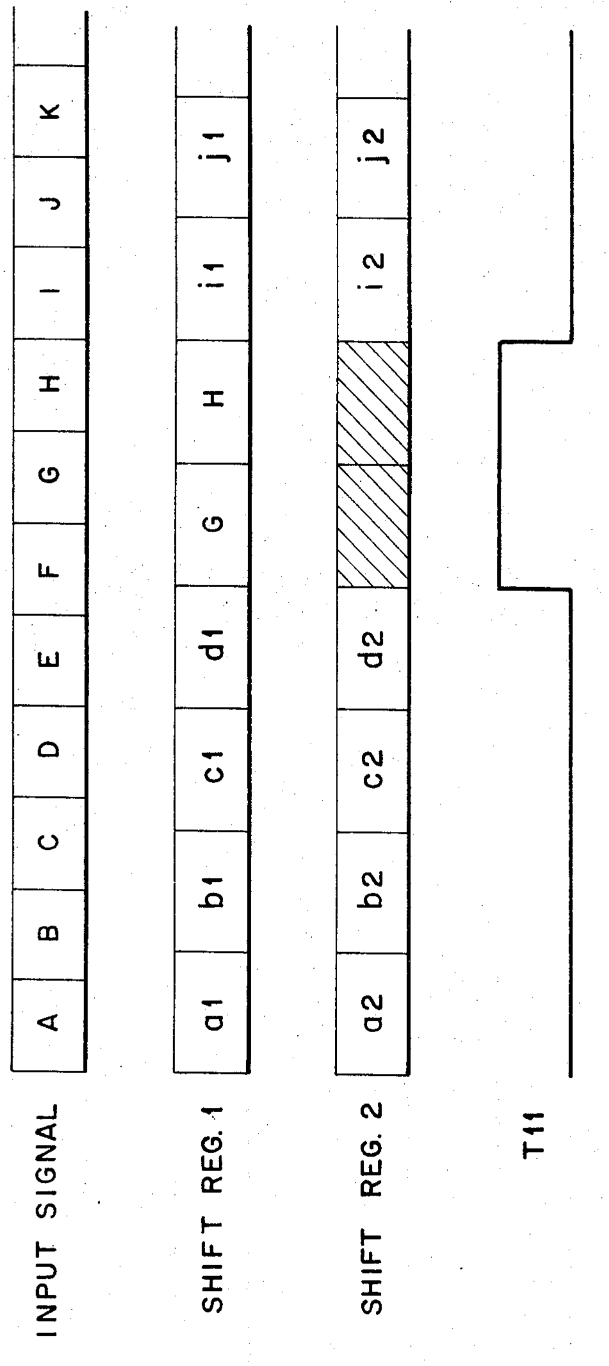
FIG. 2B sets forth a diagram showing the contents and time relationships between digits of the input signal and the shift register contents of the encoder.

Referring now to FIGS. 2A and 2B, there is shown an encoder for converting a sequence of binary elements (1, 0) into a second order ternary code (+1, 0, −1). The input signal consisting of A, B, C, D, — K is applied at input 2 to the intermediate code logic and timing arrangement 4. In this embodiment, the 6,400 bit per second encoding rate can be obtained by using a three-level secondary channel while the 4,800 bit per second rate can be obtained by leaving unused the secondary channel.

In order to avoid the use of ternary memory elements for generating the three-level dipulses, the incoming binary elements A, B, C, D, E, F, are encoded in the intermediate logic and timing arrangement as two 2-level sequences of four bits each *a1*, *b1*, *c1*, *d1*, and *a2*, *b2*, *c2*, *d2*. These four bit sequences are respectively transmitted to shift registers 1 and 2 over corresponding paths 1 and $\bar{1}$. The outputs of selective stages of the shift registers T2, T4, T6 (Reg. 1) and T8, and T10 (Reg. 2) are combined in summation amplifier 9. Significantly, the binary data elements G and H are left unchanged and transmitted directly to shift register 1 over path 1. The summation amplifier output has its upper side lobes eliminated by low pass filter 25.

If the secondary channel is not used in the case of the 4,800 bits per second transmission, the encoder is therefore reduced to shift register stages T1, T2, T3, T4 and T7, T8, T9, T10.

The generation of the two 2-level four bit sequences *a1*, *b1*, *c1*, *d1*, and *a2*, *b2*, *c2*, *d2* are a function of the logic and timing arrangement 4. In this arrangement, the binary data elements A, B, C, D, — K are stored in a shift register (not shown) included in the arrangement. The bits *a1*, *b1* and *a2*, *b2* are obtained from the binary bits A, B, C, in order to satisfy the relationships $a1 + a2 = a$ and $b1 + b2 = b$, by means of any appropriate algorithm. The algorithm should satisfy the following table:

| A | B | C | *a1* | *b1* | *a2* | *b2* | *a* | *b* |
|---|---|---|---|---|---|---|---|---|
| 0 | 0 | 0 | 1 | 1 | 1 | 0 | +1 | 0 |
| 0 | 0 | 1 | 0 | 1 | 0 | 0 | −1 | 0 |
| 0 | 1 | 0 | 1 | 1 | 0 | 1 | 0 | +1 |
| 0 | 1 | 1 | 1 | 1 | 1 | 1 | +1 | +1 |
| 1 | 0 | 0 | 1 | 0 | 1 | 0 | +1 | −1 |
| 1 | 0 | 1 | 0 | 0 | 0 | 0 | −1 | −1 |
| 1 | 1 | 0 | 1 | 0 | 0 | 0 | 0 | −1 |
| 1 | 1 | 1 | 0 | 1 | 0 | 1 | −1 | +1 |

The logic to implement the code conversion may be found in any number of well-known works as for example, "Logical Design of Digital Computers," by Montgomery Phister, published by John Wiley & Sons of New York, 1958, and in a more recent work by R. K. Richards entitled, "Digital Design," published by Wiley Interscience, New York, in 1971.

The ternary values *a* and *b* are respectively obtained by the summations of bits *a1*, *a2*, and *b1*, *b2* by summation amplifier 9. The bits *c1*, *d1*, and *c2*, *d2*, are obtained from binary data DEF in the same way.

Let us assume that the encoder operates at a rate of 6,400 bits per second. Let it further be assumed that the AND gates A2, A4, A8, A10 are initially disabled by an appropriate inhibit signal T11 applied thereto. Initially, the sequences *a1*, *b1*, *c1*, *d1* and *a2*, *b2*, *c2*, and *d2* are applied sequentially to the summation amplifier 9 over paths 7 and $\bar{7}$ and to the shift registers 1 and 2 over paths 1 and $\bar{1}$. The summation amplifier forms the sum *a*, *b*, *c*, *d* in the order shown in FIG. 10B. When the inhibit signal T11 is removed, then a1 is in stage T4, *c1* is in stage T2, *a2* is in stage T10, and *c2* is in stage T8. When T11 enables the AND gates, the inverse outputs of stages T4, T2, T10 and T8 provide the signals −*a1*, −*a2*, −*c1*, −*c2*, which after summation by the summation amplifier constitute the echo pulses $-a$ and $-c$ according to the time diagram of FIG. 10B. The echo pulses $-b$ and $-d$ are provided in the same way by the summation amplifier T/2 time units later.

Gates A14 and A15 are included in order to maintain a constant mean level at the input of the summation amplifier as a function of the possible number of pulses at this input. Lastly, in the case of 4,800 bits per second transmission, stages T5 and T6 are unused and the bits such as G and H are not transmitted.

The above description has dealt with a limited passband 0–(1/T) as applied to a basic band. It is however possible, still by making use of the coding method according to the invention, to modulate a carrier frequency in order to obtain a passband of width 1/T but shifted on the frequency axis. It is also possible, with this coding method, to modulate not one carrier frequency but two orthogonal carrier frequencies according to a process well known in the technique, thereby doubling the data rate.

While the invention has been particularly shown and described with reference to a preferred embodiment thereof, it will be understood by those skilled in the art that various changes in form and details may be made therein without departing from the spirit and scope of the invention.

What is claimed is:

1. In a multilevel digital data encoder having means for converting N successive data elements spaced apart by T/N time intervals into corresponding pulses according to the rules of the multilevel code actually used; and means for generating dipulses corresponding to the multilevel encoded pulses, each dipulse constituting a pair of spaced apart inverse pulses wherein:

the dipulse generating means include:

means for generating the first pulse of each of the N successive dipulses during corresponding ones of the first N of N+1 T/N time intervals, the N+1 time interval being unused; and means for generating the second and inverse pulse of each of the N successive dipulses, starting with the first dipulse, during corresponding ones of the next $m$N(T/N); $m$(N–1)(T/N), $m$($n$–2)(TlN),—$m$(N–N+1)(I/N) time intervals, $m$ being a constant.

2. In a digital data encoder having a first and second data channel; means in each channel for alternatively converting 2N successive data elements spaced apart by T/N time intervals into corresponding pulses according to the rules of the multilevel code actually used; and means for generating and applying to alternate channels dipulses corresponding to the multilevel encoded pulses each dipulse constituting a pair of spaced apart inverse pulses; wherein:

the dipulse generating means include:

means for generating and applying to each channel the first pulse of each of the N successive dipulses during corresponding ones of the first N of N+1 T/N time intervals the N+1 time interval being unused, and means for generating the second and inverse pulse of each of the N successive dipulses in the corresponding channel, starting with the first dipulse, during respective ones of the next $m$N(T/N), $m$(N–1)(T/N), $m$(N–2(T/N) — $m$(N–N+1)(T/N) time intervals, $m$ being a constant.

3. In a digital data receiver responsive to a data stream of N successive multilevel encoded dipulses, each dipulse consisting of spaced apart inverse pulses, the sequence of dipulses being representative of data elements converted into dipulses during corresponding, time units the time units being spaced apart by T/N seconds;

the receiver comprises:

means for providing binary signal indications for successive dipulse magnitudes decoded according to the multilevel code convention; and means for distributing received dipulse signals to the decoder means; wherein:

the distributor means include:

means for converting each received ensemble of N dipulses whose corresponding inverse pulses being spaced apart from the respective first pulse of the pair by $m$N(T/N), $m$(N–1)(T/N), $m$(N–2)(T/N)—$m$(N–N+1)(T/N), $m$ being a constant time units into a succession of N dipulses having an inverse pulse spacing of T time units.

4. A method for reducing intersymbol interference between pulses of N successively transmitted dipulses in which the first pulse of each dipulse is encoded according to the rules of a multilevel code during respective intervals of T/N seconds, the method comprising the steps of:

generating the first pulse of each N successive dipulses during respective ones of N of N+1 subsequent time intervals of T/N seconds, the N+1 time interval being unused; and generating the second and inverse pulse of each of the N successive dipulse, starting with the first dipulse, during corresponding ones of the next $m$N(T/N), $m$(N–1)(T/N), $m$(N–2)(T/N), — $m$ (N–N+1)(T/N) time intervals, $m$ being a constant, whereby the inverse pulses all occur only during the $m$(N+1) time intervals.

* * * * *